(12) United States Patent
Nishioka

(10) Patent No.: US 6,833,938 B2
(45) Date of Patent: Dec. 21, 2004

(54) VARIABLE HOLOGRAM ELEMENT, AND OPTICAL DEVICE USING THE SAME

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/769,750

(22) Filed: Jan. 26, 2001

(65) Prior Publication Data

US 2001/0028482 A1 Oct. 11, 2001

(30) Foreign Application Priority Data

Jan. 26, 2000 (JP) ........................................ 2000-017312

(51) Int. Cl.[7] ................................................ G03H 1/02
(52) U.S. Cl. ........................... 359/15; 359/15; 359/19; 359/20; 359/1; 359/275; 349/200
(58) Field of Search ............................ 359/15, 19, 20, 359/245, 275, 1; 385/40, 41, 48; 349/201

(56) References Cited

U.S. PATENT DOCUMENTS

| | | | | |
|---|---|---|---|---|
| 4,850,682 A | * | 7/1989 | Gerritsen | 349/201 |
| 5,631,754 A | * | 5/1997 | Jannson et al. | 349/130 |
| 5,942,157 A | * | 8/1999 | Sutherland et al. | 252/299.01 |
| 6,064,506 A | * | 5/2000 | Koops | 359/237 |

\* cited by examiner

*Primary Examiner*—Fayez Assaf
(74) *Attorney, Agent, or Firm*—Pillsbury Winthrop LLP

(57) ABSTRACT

The invention relates to an optical element with variable optical properties, which ensures that the amount of light available is increased, and an optical device using the same. In a liquid crystal variable hologram element 3, polymer layers 18 and liquid crystal layers 19 are alternately arranged between transparent substrates 16 and 17, with liquid crystal particles 20 lining up in each liquid crystal layer 19. When voltages are applied on transparent electrodes 21 and 22, liquid crystal molecules 23 have their longitudinal directions oriented vertically with respect to the electrodes, so that the refractive index of the polymer layers 18 is substantially equal to that of the liquid crystal layers 19, resulting in no development of hologram. When the voltages are held off, the refractive index of the polymer layers 18 is different from that of the liquid crystal layers 19. This repetition gives rise to an interference fringe action, by which a hologram can be developed. Thus, the variable hologram element 3 can function as a hologram reflecting mirror.

11 Claims, 16 Drawing Sheets

VARIABLE HOLOGRAM ELEMENT, AND OPTICAL DEVICE USING THE SAME

This application claims benefit of Japanese Patent Application(s) No. 2000-17312 filed in Japan on Jan. 26, 2000, the contents of which are incorporated by this reference.

BACKGROUND OF THE INVENTION

The present invention relates generally to an optical element with variable optical properties and an optical device using the same, and more particularly to a variable hologram element and an optical device using the same.

Among optical elements so far known to have variable optical properties, there is such a liquid crystal lens arrangement 901 as shown in FIG. 23. A light beam incident from the left of the paper is merely converted through a polarizing plate 902 to polarized light, which is then incident on a liquid crystal lens 903. When the voltage applied on the liquid crystal 904 of the liquid crystal lens 903 is held off, liquid crystal molecules 905 are oriented as shown and the refractive index of the liquid crystal 904 is so increased that the liquid crystal lens can act as a convex lens. When the voltage is put on, the liquid crystal molecules 905 are oriented parallel to an optical axis 906, resulting in a decrease in the refractive index of the liquid crystal 904. This causes the convex lens action of the liquid crystal lens to become slender. However, a problem with this liquid crystal lens arrangement 901 is that the amount of light available is limited to about 40% due to the presence of the polarizing plate 902. In FIG. 23 reference numerals 907, 908 and 909 represent a transparent electrode, a switch and an AC source, respectively.

SUMMARY OF THE INVENTION

In view of such a problem with the prior art as mentioned above, an object of the present invention is to provide an optical element with variable optical characteristics, which ensures an increased amount of light, and an optical system using the same.

The variable hologram element according to the present invention, for instance, is characterized by making use of a polymer dispersed liquid crystal or a polymer stabilized liquid crystal.

In this case, the substrate may have a lens or mirror action.

It is then preferable to meet at least one of conditions (1), (4), (8), (10) and (11).

A plurality of variable hologram elements may be laminated together with a transparent electrode interposed between them.

Using this variable hologram element, a finder for an image pickup device may be constructed.

Preferably in this case, the finder includes a light source having a short half bandwidth.

It is also preferable to meet at least one of conditions (5) and (6).

A finder for a digital camera may be constructed using the aforesaid variable hologram element.

A single-lens reflex, Galilean or Albada type finder may be constructed, using the aforesaid variable hologram element.

A wearable information device may also be constructed, using the aforesaid variable hologram element.

Preferably in this case, the wearable information device is used with a light source having a short half bandwidth.

The variable hologram element may be used for an adapter or case.

The wearable information device may also be used in the form of a head mount display.

In this case, the head mount display may be designed to have functions of glasses and a display.

A display for an image pickup device may be constructed, using the aforesaid variable hologram element.

Preferably in this case, the display includes a light source having a short half bandwidth.

The variable hologram element may be used for an adapter or case.

Variable-focus glasses may be constructed, using the aforesaid variable hologram element.

Preferably in this case, the glasses include a light source having a short half bandwidth.

Alternatively, the glasses are preferably used with a light source having a short half bandwidth.

An optical pickup may be constructed, using the aforesaid variable hologram element.

An optical pickup for disks with varying thicknesses may also be constructed, using the aforesaid variable hologram element.

Preferably in such cases, the optical pickup is preferably used with a light source having a short half bandwidth.

An optical measuring device may be constructed, using the aforesaid variable hologram element for optical path switching.

An optical measuring device may be constructed, using the aforesaid variable hologram element.

Preferably in such cases, the optical measuring device is preferably used with a light source having a short half bandwidth.

A decentration measuring device may be constructed, using the aforesaid variable hologram element for optical path switching.

A decentration measuring device may be constructed, using the aforesaid variable hologram element.

Another variable hologram element of the present invention is characterized by comprising a liquid crystal impregnated into interstitial voids in a photonic crystal.

Yet another variable hologram element of the present invention is characterized by comprising a photonic crystal and a liquid crystal.

The present invention also encompasses an endoscope characterized in that an image is formed by a digital hologram.

Preferably in this case, the endoscope satisfies condition (12).

The endoscope may also be designed in such a way as to form an image by a digital hologram using infrared light.

Preferably in this case, visible light is observable.

The endoscope may include a trichromatic light source.

When an image is formed by a digital hologram using infrared light, it is preferable to meet condition (13).

The endoscope may also include a half-silvered mirror prism.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

One embodiment of the variable hologram element according to the present invention, and embodiments of an optical device using the same are now explained.

Figure 1:
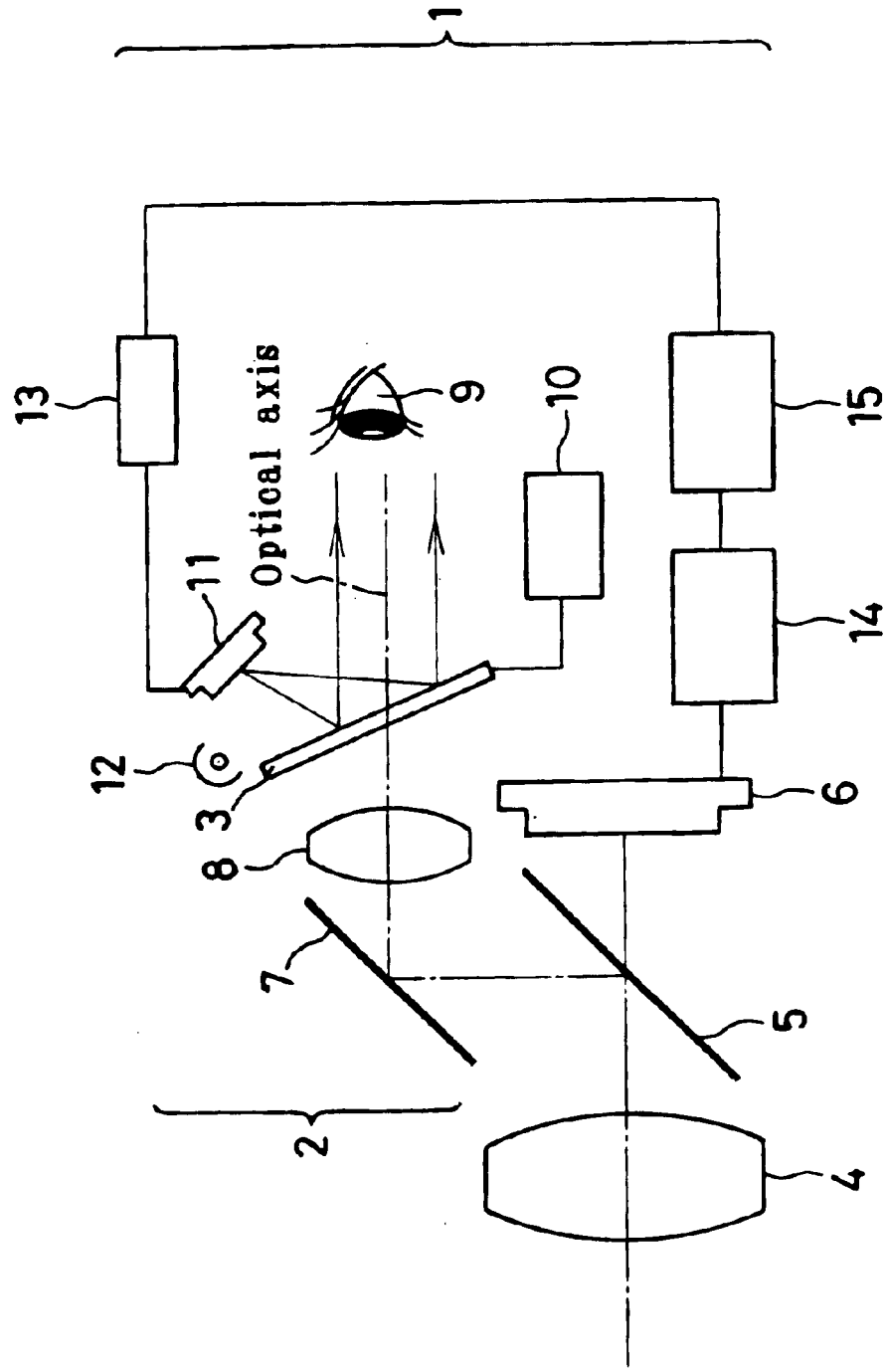
FIG. 1 is illustrative of the construction of one embodiment of the present invention, wherein the liquid crystal variable hologram element according to the present invention is used for a finder of an image pickup device.

Illustrated in FIG. 1 is one embodiment of the present invention wherein a liquid crystal variable hologram element (hereinafter LCVHE for short) 3 is used for a finder 2 of an image pickup device 1 such as a digital camera or VTR camera. This finder 2 may be used as either an optical finder or an electronic view finder. In FIG. 1 reference numerals 4, 5 and 6 represent an image pickup lens, a half-silvered mirror (or a half-silvered mirror prism) and a solid-state image sensor, respectively.

Now consider the case where the voltage applied on LCVHE 3 in the image pickup device 1 is held on. A light beam passing through the image pickup lens 4 is partially reflected and bent upwardly at the half-silvered mirror 5, then reflected and bent at the mirror 7 in the right direction, then magnified through a lens 8, and finally enters the eye 9 of an observer upon transmission through LCVHE 3. In other words, this finder functions as an optical finder. Reference numeral 10 stands for a power source for driving LCVHE 3.

Next, consider the case where the voltage applied on LCVHE 3 is held off. In this case, LCVHE 3 functions as a concave reflecting mirror and works as a part of the electronic view finder.

More specifically, a reflection type liquid crystal display indicated at 11 is illuminated with a light source 12 having a narrow wavelength width. An image picked up by the solid-state image sensor 6 provided on the reflection type liquid crystal display 11 enters the eye 9 of the observer upon magnification by LCVHE 3; that is, this image functions as a viewfinder. Here reference numerals 13, 14 and 15 indicate a liquid crystal display circuit, a CCD driving read circuit and a memory, respectively. An image signal picked up by the solid-state image sensor 6 is read out at the CCD driving read circuit. Once stored in the memory 15, the signal is fed to the liquid crystal display circuit 13 so that it is displayed on the reflection type liquid crystal display 11.

The finder 2 of such construction may be conveniently used as a viewfinder for a visual check of the image picked up by the solid-state image sensor 6 or an image at a dark place.

Figure 2:
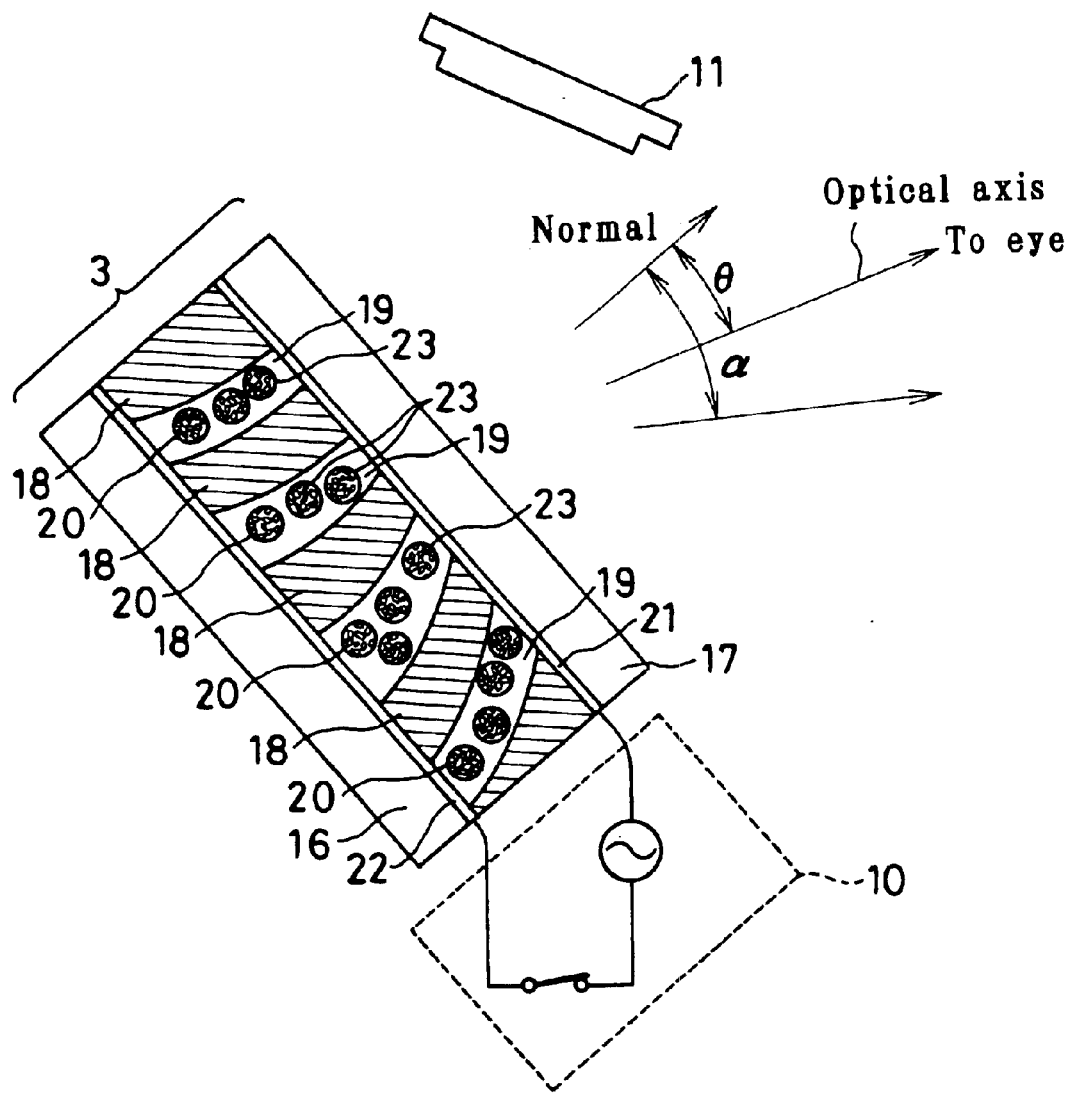
FIG. 2 is illustrative of one construction of the liquid crystal variable hologram element of FIG. 1.
Figure 3:
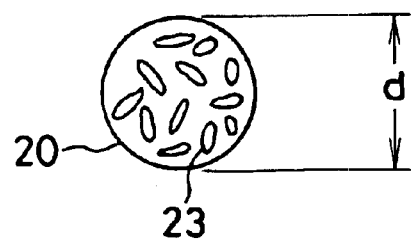
FIG. 3 is illustrative of liquid crystal particles in a liquid crystal layer.

The structure of LCVHE 3 is now explained. As shown in FIG. 2, polymer layers 18 and liquid crystal layers 19 are interposed and alternately aligned at intervals of about light's wavelength λ between transparent substrates 16 and 17. In the liquid crystal layer 19, for instance, nematic liquid crystal particles 20 are aligned and isolated from each other by a polymer sandwiched therebetween. Such a liquid crystal is called a polymer dispersed liquid crystal. As shown in FIG. 3, each liquid crystal particle 20 may be approximately regarded as a sphere having a diameter d where d is substantially equal to or smaller than light's wavelength λ. Preferably in this case, the size of the particle 20 should satisfy the following condition (1):

$$\lambda/300 < d < 5\lambda \quad (1)$$

When d is greater than the upper limit of 5λ to condition (1), there is an increased scattering of light. When d is less than the lower limit of λ/300, any variable optical properties are not obtained because the liquid crystal molecules 23 remain fixed due to their intermolecular force with the surrounding polymer. It is here noted that the wavelength λ is of the order of 400 to 700 nm in the case of visible light.

When voltages are applied on the transparent electrodes 21 and 22, the liquid crystal molecule 23 has its longitudinal direction located vertically with respect to the electrodes. In this embodiment, a nematic liquid crystal of positive dielectric anisotropy is used for the liquid crystal molecule 23. In the present invention, however, not only a nematic liquid crystal of negative dielectric anisotropy but also various liquid crystals such as cholesteric, smectic, ferroelectric, and discotic liquid crystals may be used. Alternatively, a polymer stabilized liquid crystal may be used for the liquid crystal layer 19. By the "polymer stabilized liquid crystal" used herein is intended a liquid crystal wherein liquid crystal molecules 23 are isolated from each other by a polymer wall or network. Liquid crystals having a structure other than those mentioned above and containing polymers may also be available. It is thus noted that substances containing such polymers and liquid crystals shall be all encompassed in the polymer dispersed liquid crystals or polymer stabilized liquid crystals.

Such various liquid crystals as mentioned above may equally be used for other embodiments of the present invention.

Figure 4:
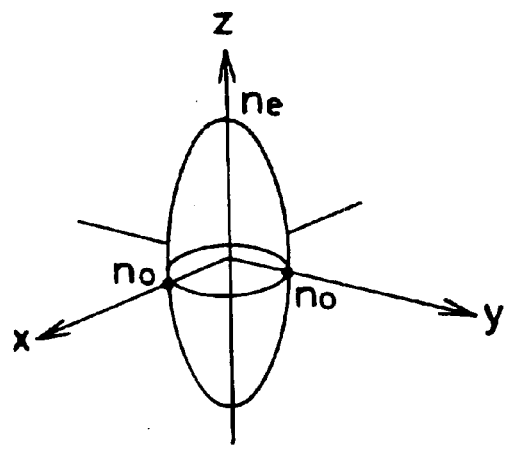
FIG. 4 is illustrative of an indicatrix for a liquid crystal molecule.

FIG. 4 illustrates an indicatrix for the liquid crystal molecule 23, wherein:

$$n_e > n_o \quad (2)$$

The liquid crystal used herein is a positive uniaxial liquid crystal with its z axis being in coincidence with the longitudinal direction of the liquid crystal molecule 23.

In the aforesaid embodiment, the liquid crystal molecule 23 has its longitudinal axis located in the vertical direction with respect to the transparent substrates 16 and 17. For this reason, the refractive index of the liquid crystal molecule 23 with respect to light propagating in a direction parallel with respect to the normal to the transparent substrate 17, viz., the longitudinal axis of the liquid crystal molecule 23 is isotropic, and given by $n_o$.

In this case, the refractive index $n_p$ of the polymer layer satisfies $$n_p = n_o \quad (3)$$

More exactly, the refractive index $n_p$ of the polymer layer 18 should satisfy $$|n_p - n_o| < 0.15 \quad (4)$$

If this is the case, LCVHE 3 becomes equivalent to a transparent glass plate with respect to light propagating in the normal direction. In other words, no hologram effect is produced.

As shown in FIG. 2, the optical axis of the finder 2 is at an angle of just θ with respect to the direction of the normal to LCVHE 3. If $$0 \le |\theta| < 30° \quad (5)$$

then LCVHE 3 is not allowed to function as a hologram because the liquid crystal molecule 23 is of limited birefringence; the finder 2 can function as an optical finder. Alternatively, it is acceptable that the maximum value $\alpha_{max}$ of the angle α of a light ray passing through LCVHE 3 with respect to the normal is given by $$0 \le |\alpha_{max}| < 40° \quad (6)$$

By meeting condition (6), the finder 2 is also allowed to function as an optical finder.

Next, consider the case where the voltage applied on LCVHE 3 is put off. Then, the liquid crystal molecules 23 are oriented in random directions and, hence, the refractive index $n_L$ of the liquid crystal layer 19 is given by $$n_L = w n_p + (1-w)(2n_o + n_e)/3 \quad (7)$$

Here w is the volumetric proportion of the polymer in the liquid crystal layer 19. The polymer surrounds the liquid crystal particle 20 or isolates the liquid crystal molecules 23 from each other in a network fashion. In other words, the polymer dispersed liquid crystal or polymer stabilized liquid crystal state is achieved.

The smaller the value of w, the better the characteristics of the resultant hologram are. However, too small a value of w causes the voltage on-off response speed of the liquid crystal to become slow. It is therefore required that the following condition (8) be satisfied:

$$0.005 < w < 0.7 \quad (8)$$

When w exceeds the upper limit of 0.7, the difference between $n_L$ and $n_p$ becomes too small to achieve the hologram effect when the voltage is put off, as explained below.

Figure 5:
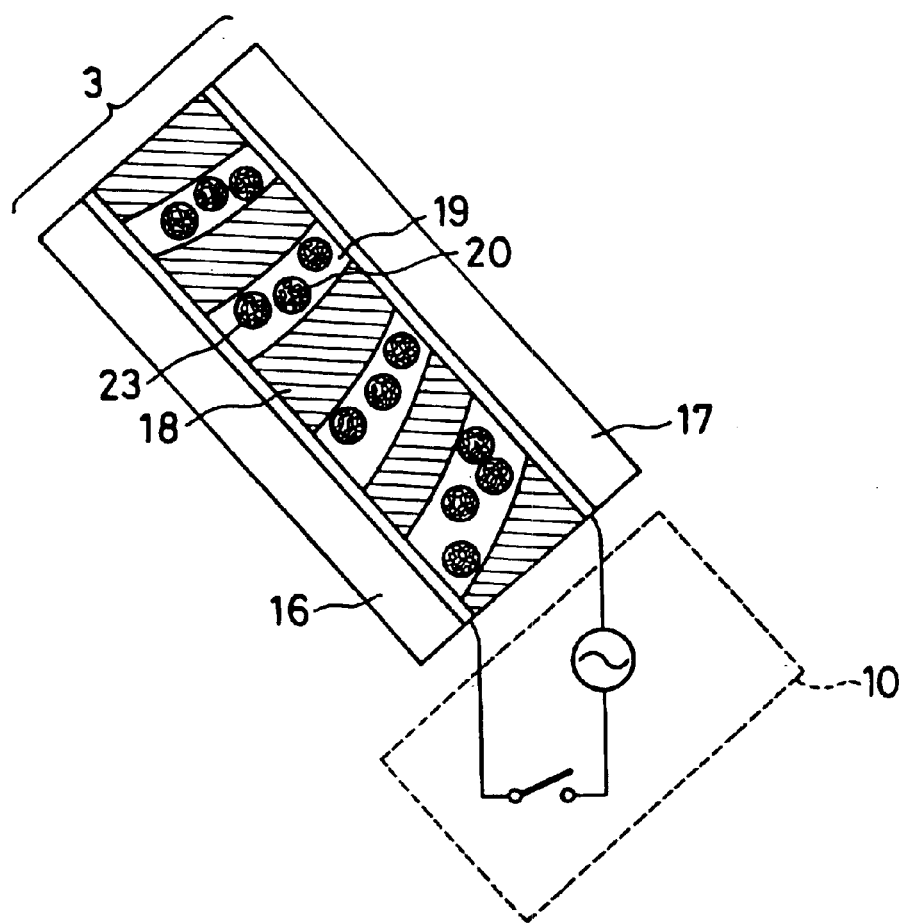
FIG. 5 is illustrative of one state where the voltage applied on the liquid crystal variable hologram element of FIG. 1 is held off.

In the state of FIG. 5, $n_p \ne n_L$ and the polymer layers 18 and the liquid crystal layers 19 are alternately repeated. This repetition acts as interference fringes, which allow LCVHE 3 to function as a hologram reflecting mirror. This then allows an image on the reflection type liquid crystal display 11 to be reflected at LCVHE 3 to enter the eye 9, so that the image picked up by the image pickup device 1 can be observed. In other words, the finder 2 can function as an electronic viewfinder.

Figure 6:
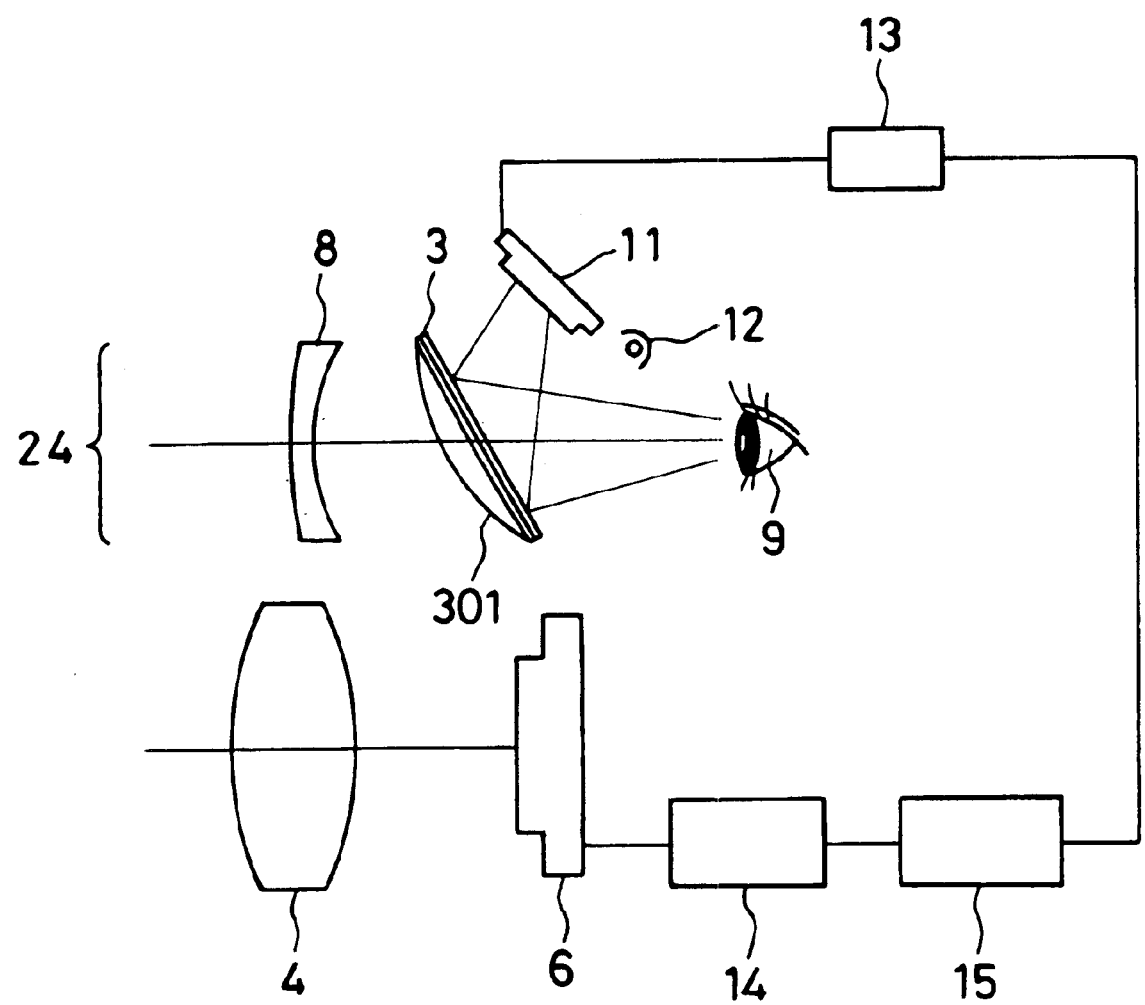
FIG. 6 is illustrative of one construction of another type of finder.

In the embodiment of FIG. 1, the optical finder is of the single-lens reflex type. However, the optical finder may be of either the Albada type or the Galilean type, as shown in FIG. 6. Alternatively, the LCVHE may be used for a Keplerian type finder, although not illustrated. In the embodiment of FIG. 6, the substrate for LCVHE 3 is configured in the form of a lens surface 301, thereby imparting a lens action thereto. To put it another way, LCVHE 3 may also be formed on a curved surface. By way of example but not by way of limitation, the lens surface 301 may be configured in the form of a spherical, planar or aspherical surface. In view of correction of aberrations, however, it is particularly preferable that the lens surface 301 is configured in the form of a free curved surface having no rotational symmetry. It is of course acceptable to provide the substrate with a reflective coating or the like, thereby imparting a mirror action thereto.

Figure 7:
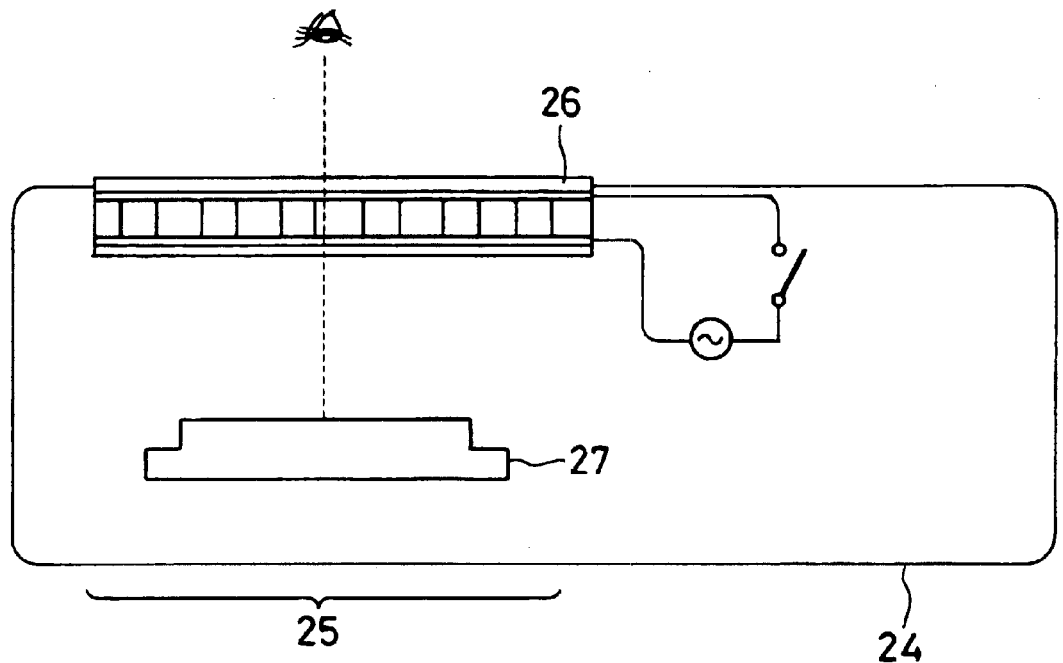
FIG. 7 is illustrative of the construction of one embodiment of the present invention wherein the liquid crystal variable hologram element according to the present invention is used for display means of a wearable information device.

FIG. 7 is illustrative of another embodiment of the present invention, wherein an LCVHE 26 is used for a display 25 of a wearable information device 24 such as a portable personal computer, a portable telephone, and a PDA (personal digital assistant). LCVHE 26 is substantially identical in structure with the aforesaid LCVHE 3. However, this LCVHE 26 is allowed to act as a transparent plate when the voltage applied on LCVHE 26 is held off. It follows that $$n_p = n_L \tag{9}$$

More exactly, it is more preferable that $$|n_p - n_L| < 0.15 \tag{10}$$

Accordingly, it is then possible for the user to view images, letters, etc. on a display 27, for instance, a liquid crystal display through LCVHE 26. Generally, the wearable information device 24 may be used while carried by a user's hand or placed on a desk.

Figure 8:
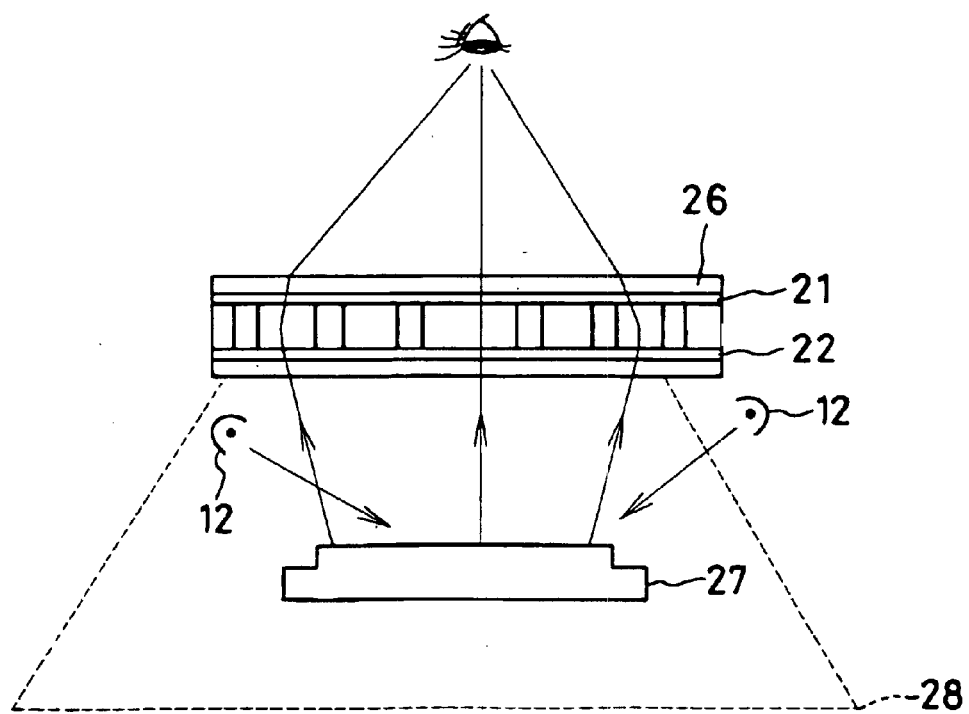
FIG. 8 is illustrative of the embodiment of FIG. 7, wherein the liquid crystal variable hologram element is allowed to act as a loupe.

When the voltage applied on LCVHE 26 is held on, LCVHE 26 is allowed to act as a loupe. As shown in FIG. 8, a magnified image 28 on the display 27 is formed through LCVHE 26, so that the user can view the magnified image 28. Preferably in this case, the display 27 is designed to display finer pictorial information and textual information as compared with the case of FIG. 7, because it is possible to provide the user with much more information as compared with the case of FIG. 7.

When the voltage applied on LCVHE 26 is held on, it is preferable that $$n_p > w n_o + (1-w) n_p \tag{11}$$

This is because LCVHE 26 is allowed to act as a hologram producing a loupe effect. In this case, it is preferable that the display 27 is illuminated with a light source 12 such as an LD, and an LED.

Figure 9:
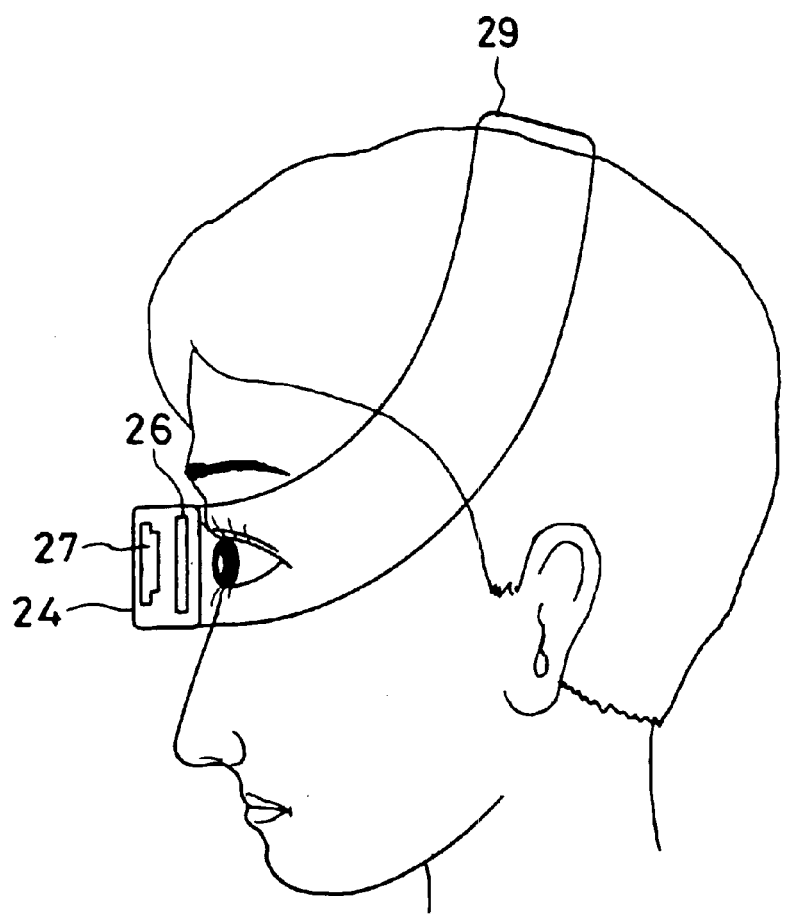
FIG. 9 is illustrative of the construction of the wearable information device designed in the form of a head mount display.

When the voltage applied on LCVHE 26 is held on, it is acceptable to use the wearable information device 24 while mounted on a user's head. In other words, it is acceptable to design the wearable information device 24 in the form of an HMD (head mount display) 29, as shown in FIG. 9. This is more preferable because LCVHE 26 can be located nearer to the eye of the user and the focal length f of LCVHE 26 can be made so short that the size of the magnified image 28 on the display 24 can be made much larger.

Figure 10:
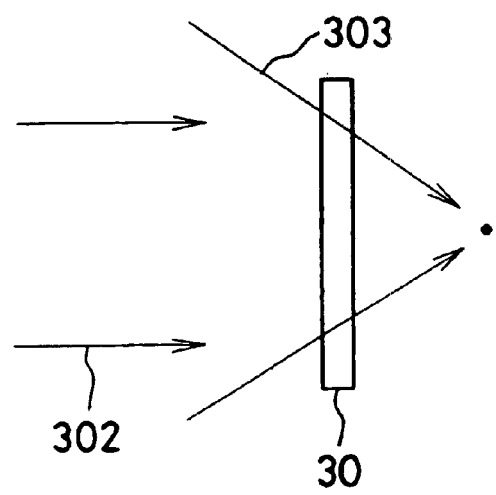
FIG. 10 is illustrative of how to make the liquid crystal variable hologram element of the present invention.

For instance, LCVHE 26 may be made by such a process as shown in FIG. 10. Light coming from a coherent light source such as a laser is divided to two light beams, one of which is a substantially parallel beam 302 to be incident on a liquid crystal/monomer mixed layer 30 prior to exposure. At the same time, another light beam 303 is refracted as by a lens in such a way that it converges on one point, and then entered into the monomer mixed layer 30. The resulting interference of two light beams 302 and 303 gives rise to a site where the intensity of light is so increased that the monomers can be photopolymerized to a polymer. LCVHE 3, too, may be made in much the same manner as mentioned above. Exemplary monomers are NOA-65 made by Norland Co., Ltd., and exemplary liquid crystals are MBBA, and CB-5. It is here noted that the variable hologram or LCVHE may be fabricated by lithography.

Figure 11:
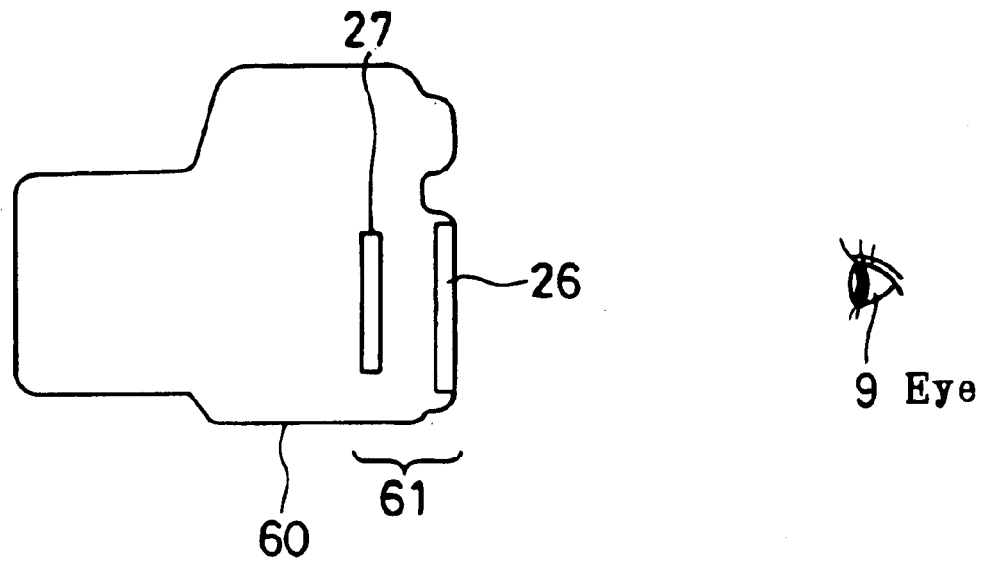
FIG. 11 is illustrative of one embodiment of the present invention, wherein the liquid crystal variable hologram element according to the present invention is used for a display of a digital camera.
Figure 12:
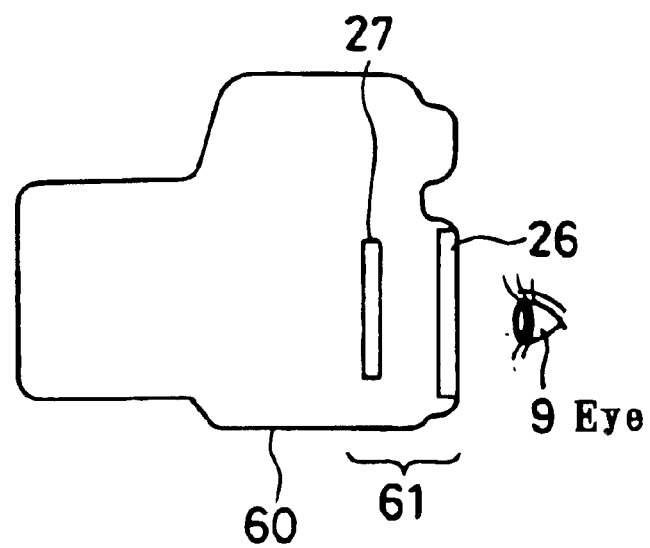
FIG. 12 is illustrative of the embodiment of FIG. 11, wherein the liquid crystal variable hologram element is allowed to act as a loupe.

It is here noted that a display 25 comprising a combined LCVHE 26 and display 24 may be used as a display 61 for a digital camera 60 as shown in FIG. 11. When LCVHE 26 acts as a transparent plate, the display 27 acts as an ordinary display. When LCVHE 26 acts as a loupe, a magnified image can be viewed by bringing the eye 9 nearer to the display, as shown in FIG. 12.

Figure 13:
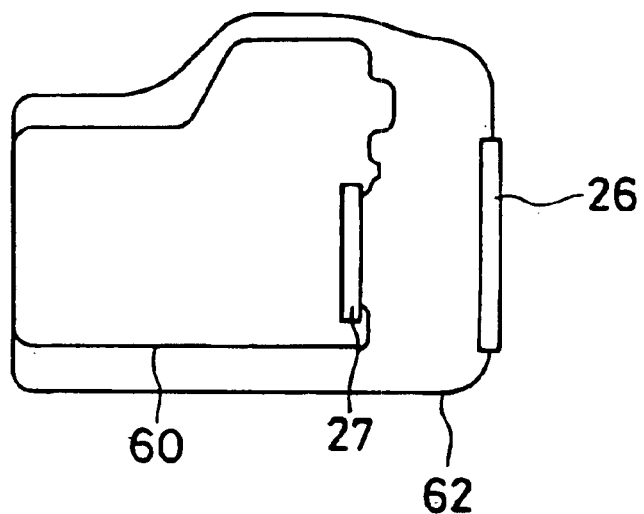
FIG. 13 is illustrative of one embodiment of the present invention, wherein the liquid crystal variable hologram element according to the present invention is detachably attached to an adapter provided separately from a digital camera.
Figure 14:
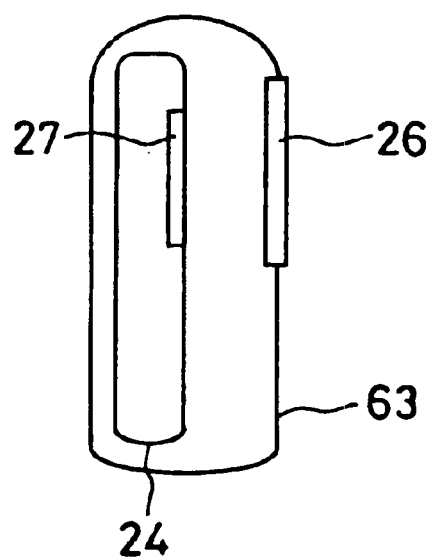
FIG. 14 is illustrative of one embodiment of the present invention, wherein the liquid crystal variable hologram element according to the present invention is detachably attached to an adapter provided separately from a wearable information device.

As shown in FIG. 13, LCVHE 26, provided separately from the digital camera 60, may be attached to an adapter 62, which may be detachably attached to the digital camera 60. Alternatively, LCVHE 26 may be attached to a case for the digital camera 60. Still alternatively, the adapter 62 may be designed to serve as a case for the digital camera 60. It is acceptable to use a fixed-focus lens in place of the display 27. In the case of the wearable information device 24, too, it is acceptable to provide LCVHE 26 separately from the display 17, as shown in FIG. 14. It is also acceptable to attach LCVHE 26 to the adapter 63, which may be detachably attached to the wearable information device 24. Further, it is acceptable to attach LCVHE 26 to a case for the wearable information device 24. Alternatively, it is acceptable to design the adapter 63 as the case for the wearable information device 24.

Figure 15:
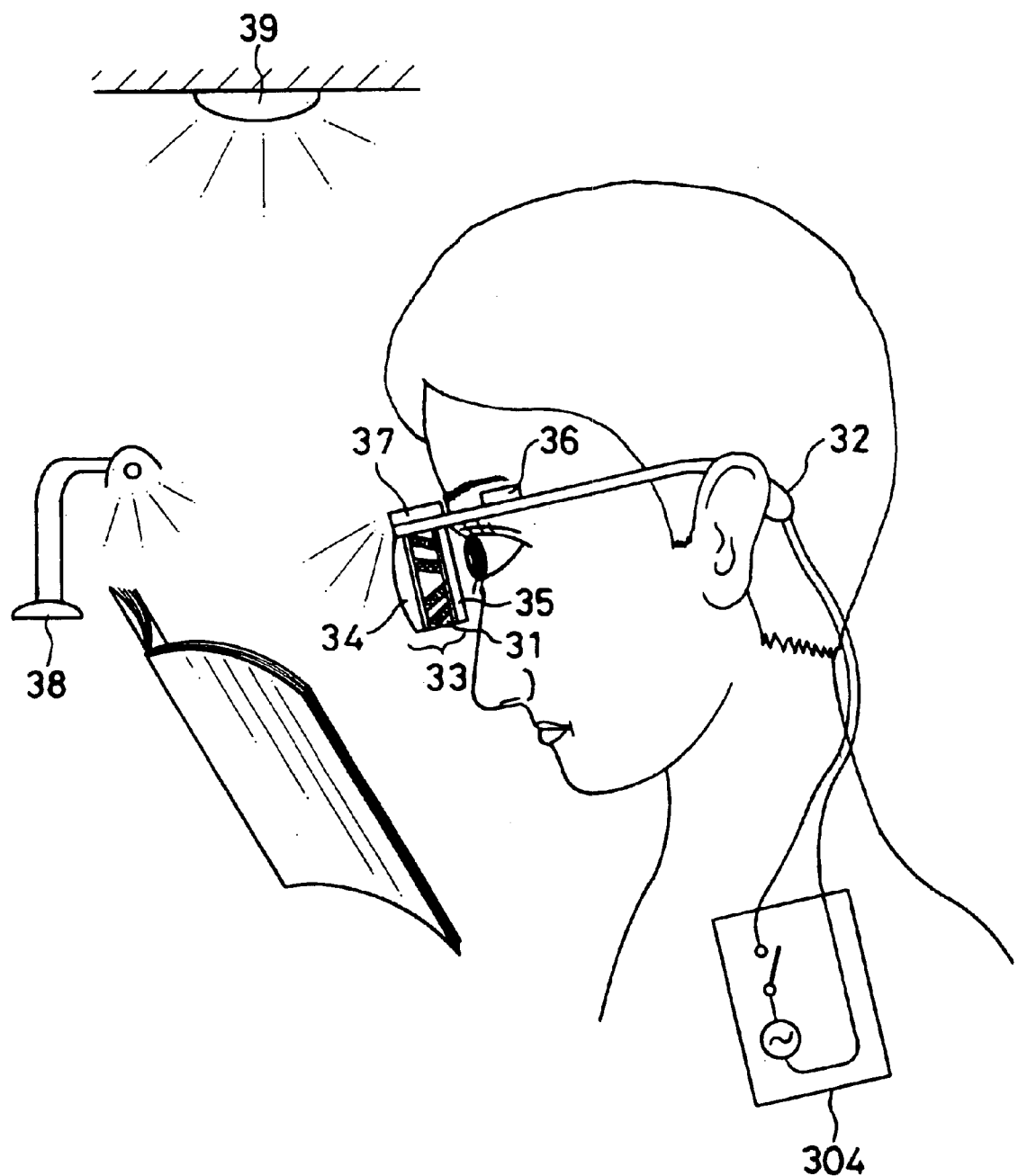
FIG. 15 is illustrative of one embodiment of the present invention, wherein the liquid crystal variable hologram element according to the present invention is used for lenses for variable-focus glasses.

FIG. 15 illustrates yet another embodiment of the present invention, wherein an LCVHE 31 is used for lenses 33 for variable-focus glasses 32. By on-off control of voltage by means of a controller 304, the lenses 33 are allowed to have an increased lens action or act as transparent plates. This enables the diopter of the glasses to vary so that even a farsighted person can look at both a near point and a far point without glasses replacement. If substrates 34 and 35 for the lenses 33 may be configured in the form of lenses, it is then possible to achieve glasses whose power is variable by on-off control of voltage. If a distance sensor 36 is attached to the glasses, on-off control of voltage applied on LCVHE 31 can be automated.

It is preferable to use for illumination light a light source 37 having a short wavelength half bandwidth, because hologram performance can be improved. For the light source 37, for instance, trichromatic (red, green, and blue) semiconductor lasers, and LEDs may be used. These light sources have all a short half bandwidth. More preferably, the half bandwidth of wavelength should be 100 μm or less.

Instead of attaching the light source 37 to the glasses 32, it is also preferable to attach the light source 37 to a stand 8 or indoor illumination equipment, because the weight of the glasses 32 can be reduced.

Figure 16:
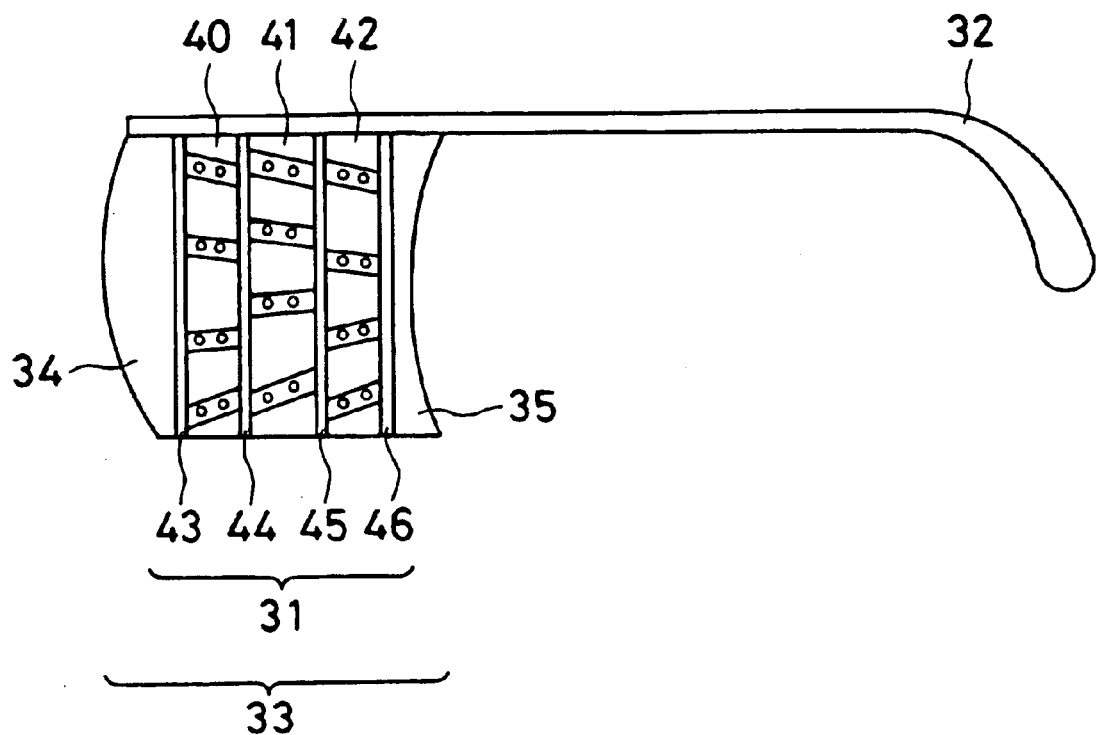
FIG. 16 is a detailed representation of the lenses for variable-focus glasses.

FIG. 16 is a detailed representation of the lenses 33 for the variable-focus glasses 32. As shown, three LCVHE layers 40, 41 and 42 are provided for red light, green light and blue light, with reference numerals 43, 44, 45 and 46 standing for transparent electrodes. In synchronism with only one light source turned on, the LCVHE of the same color is allowed to act as a hologram. This operation is sequentially carried out for other colors. Thus, the variable-focus glasses 32 enable natural colors to be reproduced. It is then preferable to interpose transparent electrodes, each with no transparent substrate, between LCVHEs 40, 41 and 42, because significant weight reductions are achievable.

Figure 17:
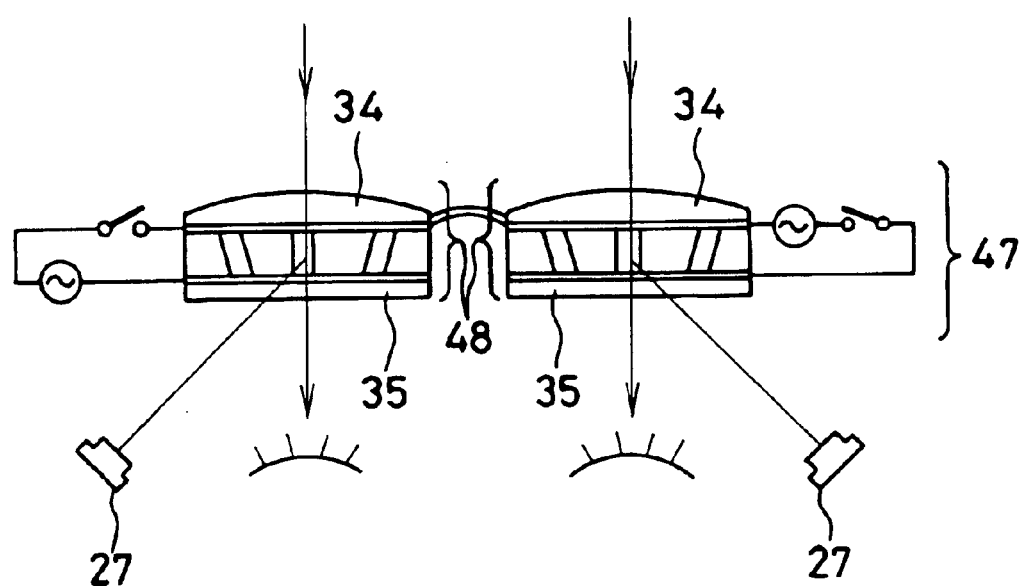
FIG. 17 is illustrative of one embodiment of the present invention, wherein a glasses function is imparted to a head mount display.

FIG. 17 is illustrative of a further embodiment of the present invention, wherein a glasses function is imparted to an HMD 47. By varying the voltage applied on an LCVHE 48, LCVHE 48 is allowed to become transparent and so act as glasses, or act as a reflecting mirror to view a display 24 on an magnified scale. If substrates 34 and 35 are configured in the form of lenses compatible with the diopter of user's eyes, it is then possible to use them in the form of either a display or glasses.

Figure 18:
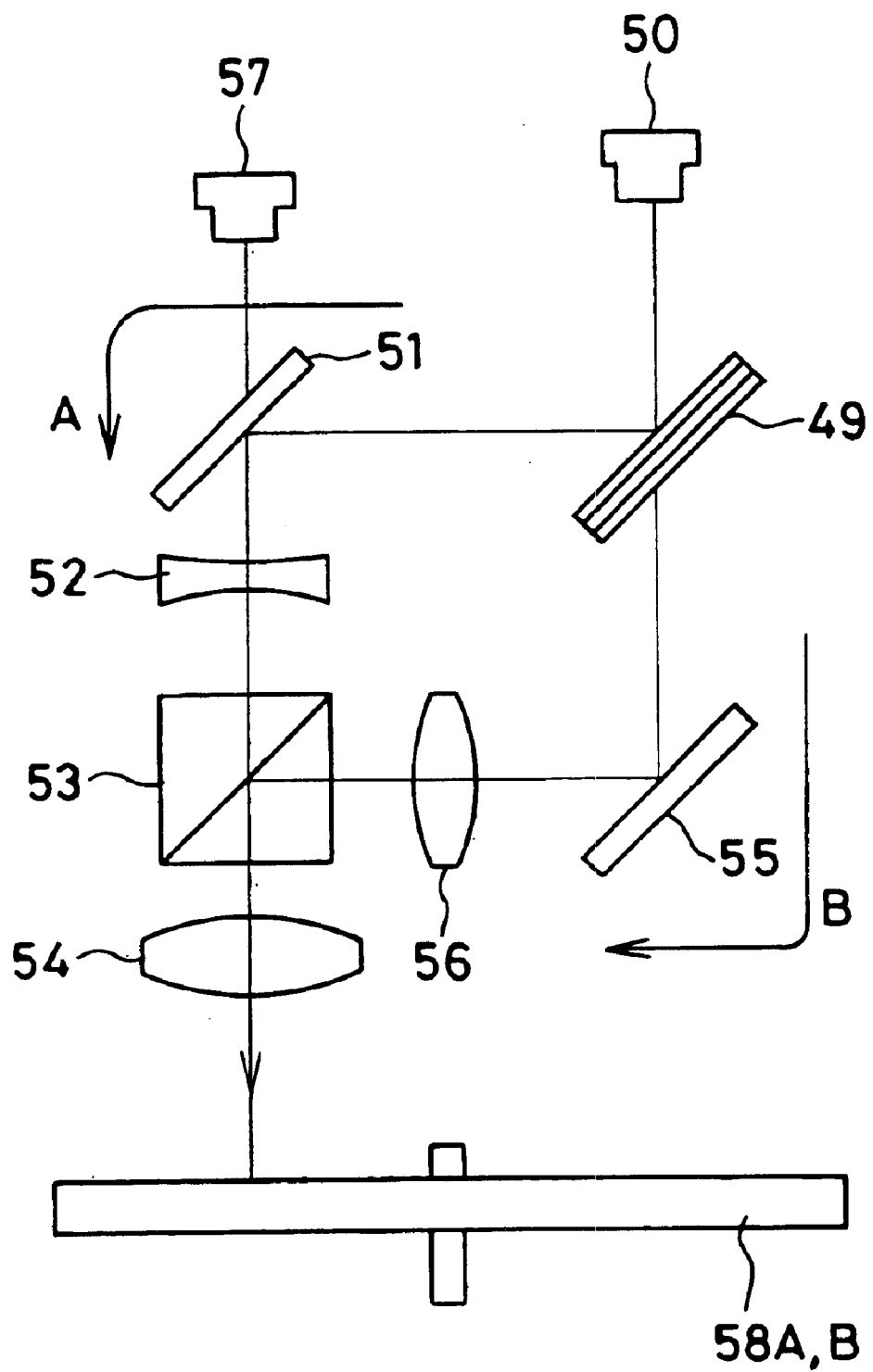
FIG. 18 is illustrative of one embodiment of the present invention, wherein the liquid crystal variable hologram element according to the present invention is used for an optical pickup optical system for optical disks with varying thicknesses.

FIG. 18 is illustrative of a further embodiment of the present invention, wherein an LCVHE 49 is used for an optical pickup optical system, which can be used with optical disks 58 with varying thicknesses. When the voltage of LCVHE 49 is held off, light leaving a semiconductor laser 50 takes an optical path A, then passes a half-silvered mirror 51, a lens 52, a beam splitter 53 and a lens 54, and finally enters one optical disk 58A. When the voltage of LCVHE 49 is held on, the light takes an optical path B, then passes a mirror 55, a lens 56, beam splitter 53 and lens 54, and finally enters an optical disk 58B having a different thickness. By designing the lenses 52 and 56 in an appropriate fashion, it is possible to achieve an optical pickup optical system that can be used for either one of optical disks 58A and 58B. In FIG. 18, reference numeral 57 represents a photo-detector for reading the optical disks 58A and 58B.

Figure 19:
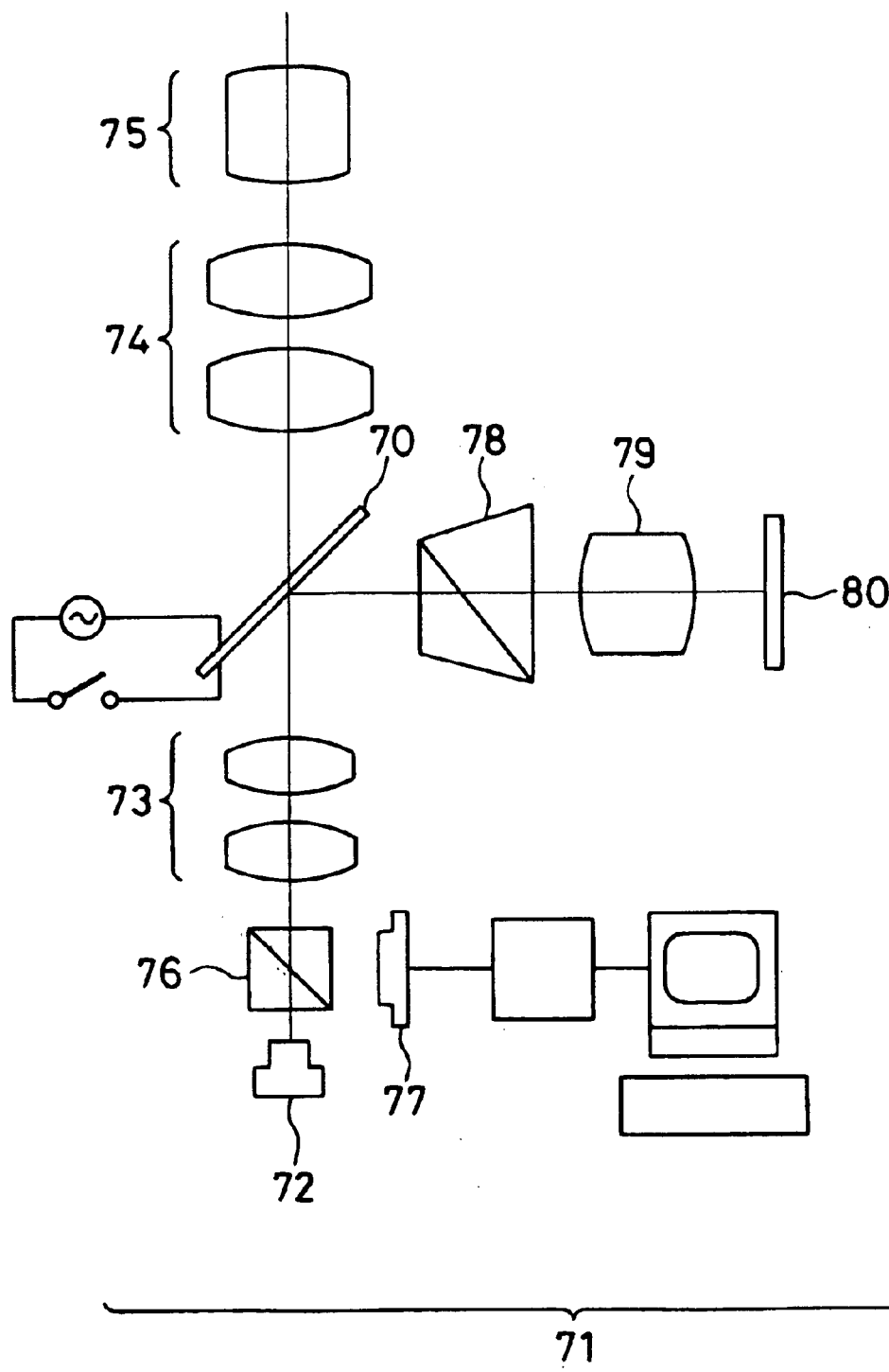
FIG. 19 is illustrative of one embodiment of the present invention, wherein the liquid crystal variable hologram element according to the present invention is used for an optical measuring device.

FIG. 19 is illustrative of a further embodiment of the present invention, wherein an LCVHE 70 is used for an optical measuring device, e.g., a measuring device 71 for measuring the decentration of a lens upon assembled. A measuring device used for similar purposes is also described in JP-A 07-140038. LCVHE 70 functions as an optical path switching variable optical element. At this time, the voltage applied on LCVHE 70 is held on.

First, consider the case where LCVHE 70 acts as a transparent plate. Light leaving a light source 72 passes a half-silvered mirror prism 76, a lens 73, LCVHE 70 and a lens 74, and finally enters a lens 75 to be examined. This optical path is herein called the optical path to be examined. A semiconductor laser, an LED or the like is suitable for the light source 72. Light reflected at either surface of the lens 75 to be examined travels back, and is then reflected at the half-silvered mirror prism 76 to form an image at an image pickup element 77.

When LCVHE 70 acts as a reflecting mirror, i.e., the voltage applied on LCVHE 70 is held off, the light leaving the light source 72 takes an optical path comprising half-silvered mirror prism 76, lens 73, LCVHE 70, an image rotator 78, a lens 79 and a mirror 80, and is then reflected at mirror 80, from which the light goes back, and passes through half-silvered mirror prism 76 and an image pickup element 77, on which an image is formed. This optical path is herein called the reference optical path.

Upon rotation of the image rotator 78, the image-formation point of the light beam taking the reference optical path on the image pickup element 77 is rotated in a circular orbit. From a difference between the center of rotation and the image-formation point on the optical path to be examined, the amount of decentration of the surface of the lens 75 to be examined, at which the light beam is reflected, can be found.

Then, the positions of lenses 73, 74 and 89 are regulated so that the amouont of decentration of other surface of the lens 75 to be examined can be determined in a similar manner.

The merit of this arrangement is that measurements can be carried out with higher accuracy as compared with the case where an optical path switching prism or mirror is used instead of LCVHE 70.

Figure 20:
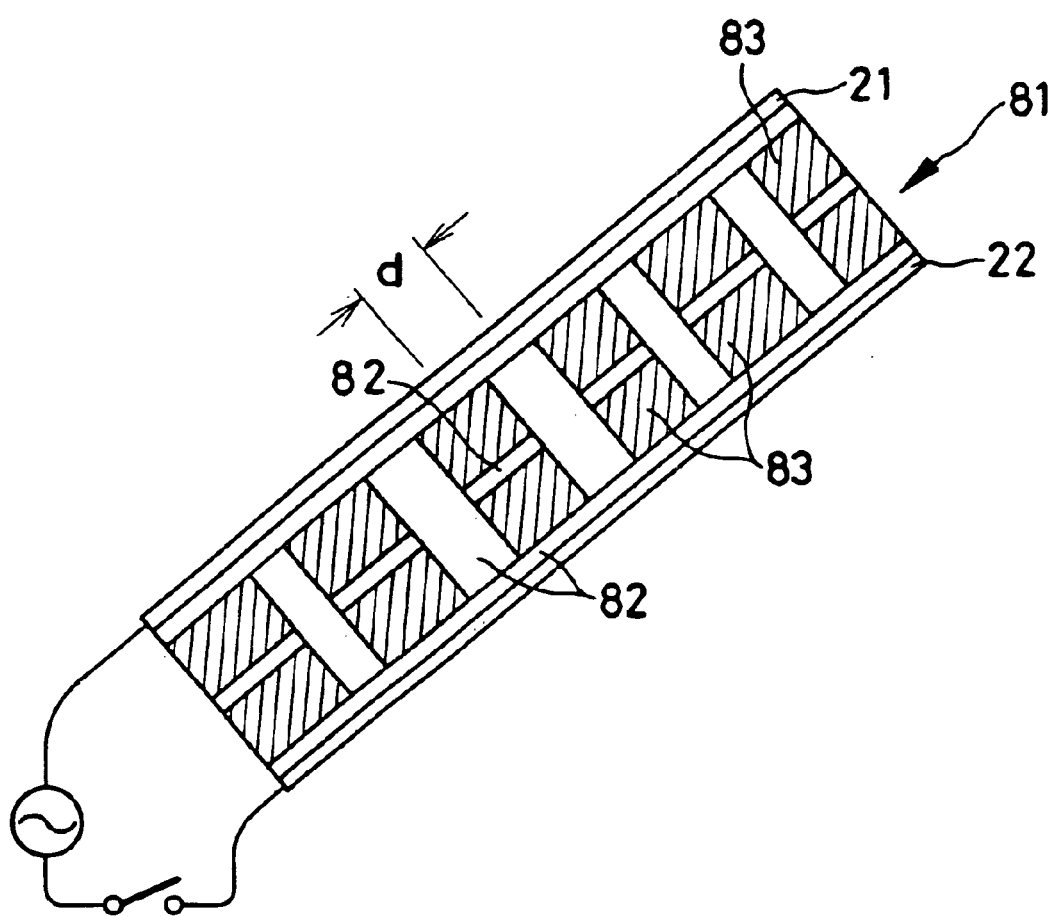
FIG. 20 is illustrative of the variable hologram element of the present invention, which is constructed using a photonic crystal.

In this embodiment, too, LCVHE 70 may be made in the same manner as already explained with reference to FIG. 10. However, it is acceptable to use a liquid crystal photonic crystal 81 made by such a process as shown in FIG. 20. The liquid crystal photonic crystal 81 is one of LCVHEs, wherein liquid crystals 83 are impregnated into interstitial voids in a three-dimensional lattice form of photonic crystal 82 prepared by lithography, epitaxial growth processes or the like. This liquid crystal photonic crystal 81 is more preferable because a hologram can be made with higher accuracy as compared with the case of FIG. 10.

Here let $n_s$ represent the refractive index of the photonic crystal 82. If $n_p$ is replaced by $n_s$, then the aforesaid conditions (4), (5), (6), (7), (9) and (10) are again true. When liquid crystal molecules are oriented in random directions, condition (7) also holds for the liquid crystal photonic crystal 81, provided that w=1. If d is defined by ½ of the lattice spacing shown in FIG. 20, condition (1), too, holds.

The aforesaid liquid crystal photonic crystal 81 may be applied to other embodiments of the present invention.

In the embodiments of the present invention, variable hologram elements other than LCVHEs may be used. Such variable hologram elements, for instance, include a variable diffractive optical element formed of a substance having a magneto-optic effect, a variable mirror array (DMD made by Texas Instrument Co., Ltd.), and a variable diffractive optical element formed of barium titanate.

Figure 21:
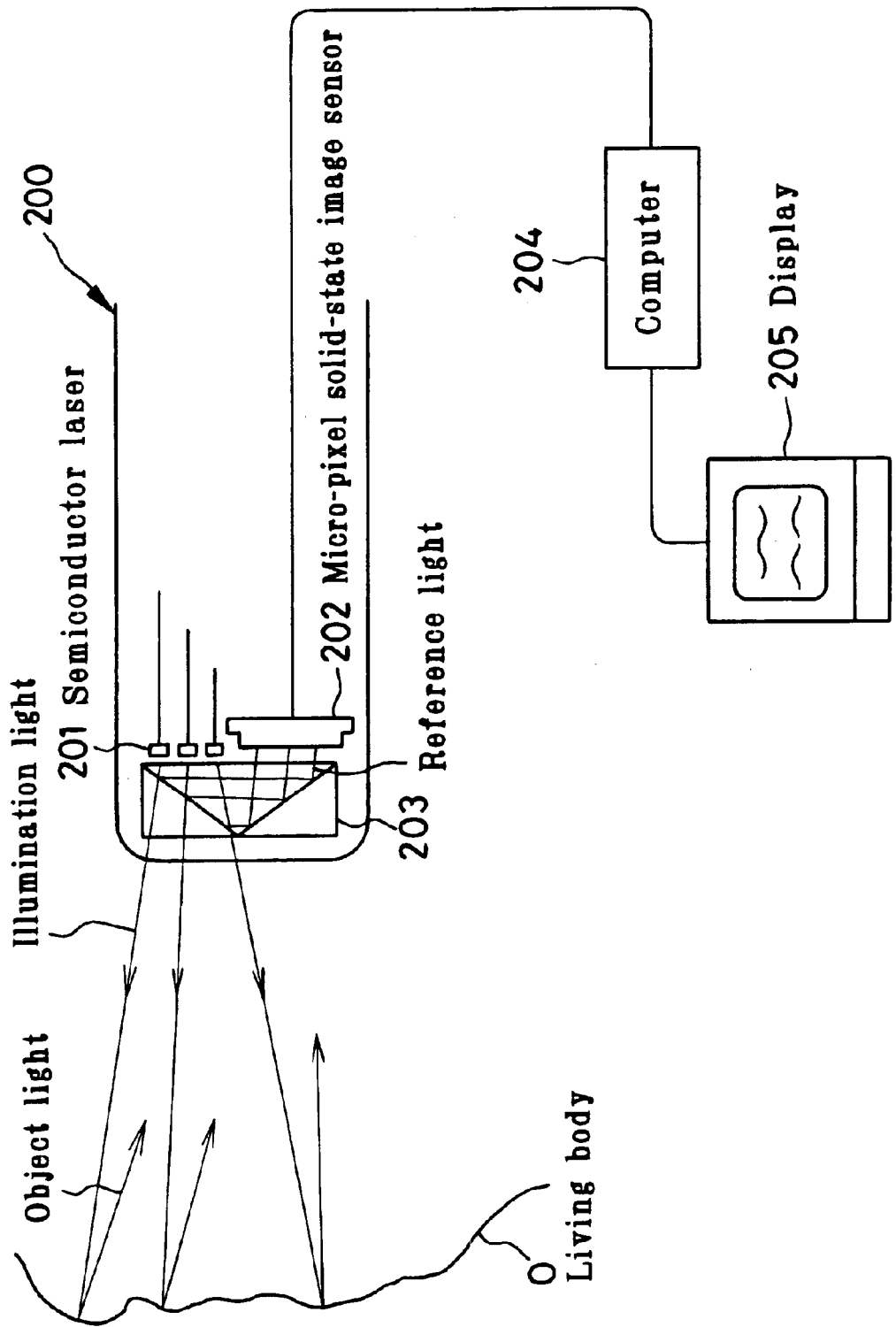
FIG. 21 is illustrative of one construction of the digital hologram endoscope according to the present invention.

FIG. 21 is illustrative of a further embodiment of the present invention, i.e., a digital hologram endoscope 200. One portion of light leaving a semiconductor laser 201 is incident on and reflected at an object (e.g., a living body or human body) O, going back to a micro-pixel solid-state image sensor 202. On the other hand, another portion of light leaving the semiconductor laser 201 is reflected at a half-silvered mirror prism 203, entering the micro-pixel solid-state image sensor 202. The resulting interference of two light components causes interference fringes to be formed on the micro-pixel solid-state image sensor 202. Then, the interference fringes are captured in a computer 204, where they are analyzed to display the thus analyzed image on a display 205.

This embodiment is characterized in that digital hologram images are obtained, and is excellent in that three-dimensional images are obtained.

The semiconductor lasers 201 are sequentially turned up in the order of red, green and blue, and images reproduced from a hologram for each color are superposed one upon another to obtain a color image.

The size P of one pixel in the micro-pixel solid-state image sensor 202 should preferably be as small as possible, because it is then possible to make the field angle of the hologram wide.

It is preferable to meet the following condition (12):

$$0.1\ \mu m \leq P \leq 4\ \mu m \qquad (12)$$

This is because a wider field angle is achievable with more improved resolving power. When the lower limit of 0.1 μm to this condition is not reached, it is difficult to fabricate the micro-pixel solid-state image sensor 202. In view of cost reductions of the solid-state image sensor, it is practically more preferable to satisfy the following condition (12-1):

$$2\ \mu m \leq P \leq 15\ \mu m \qquad (12\text{-}1)$$

Figure 22:
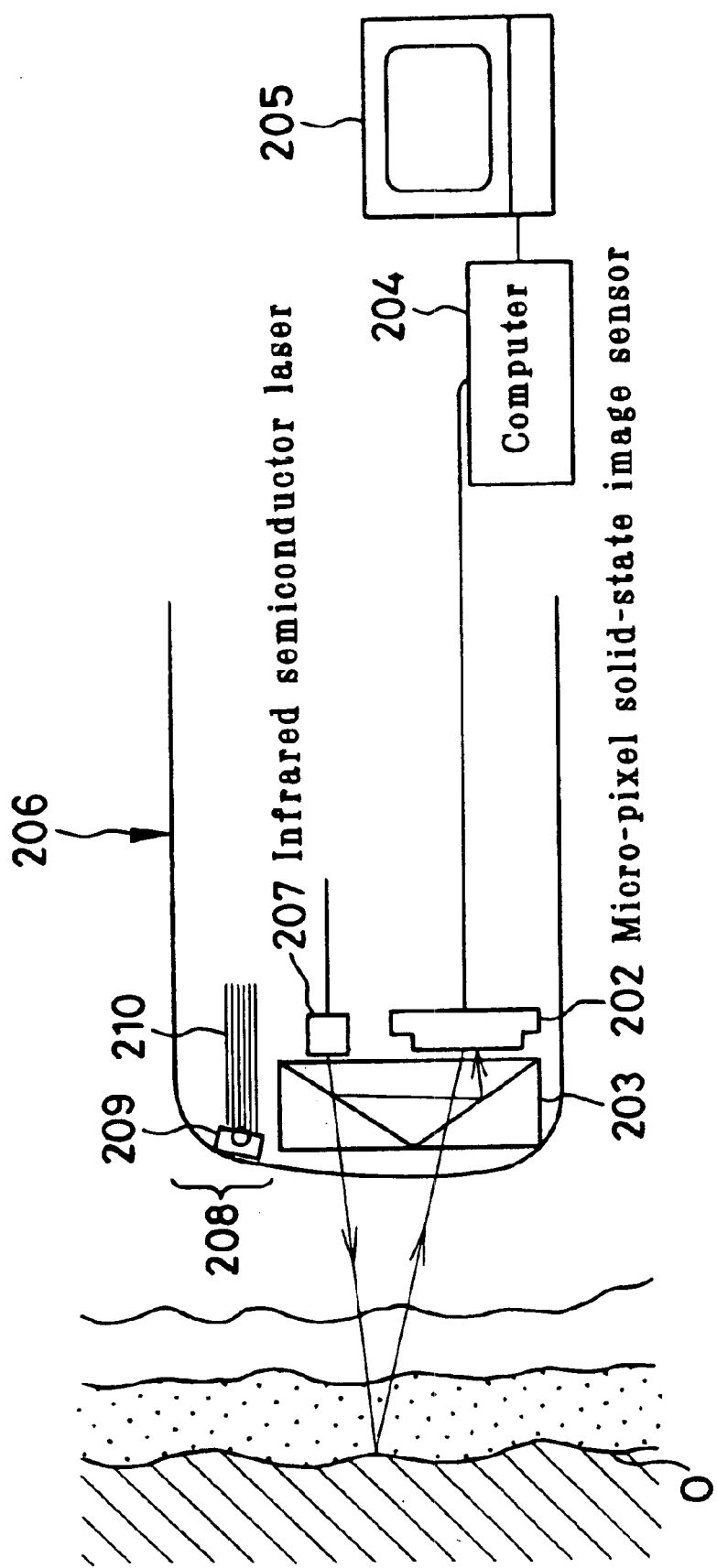
FIG. 22 is illustrative of one construction of the infrared digital hologram endoscope of the present invention.
Figure 23:
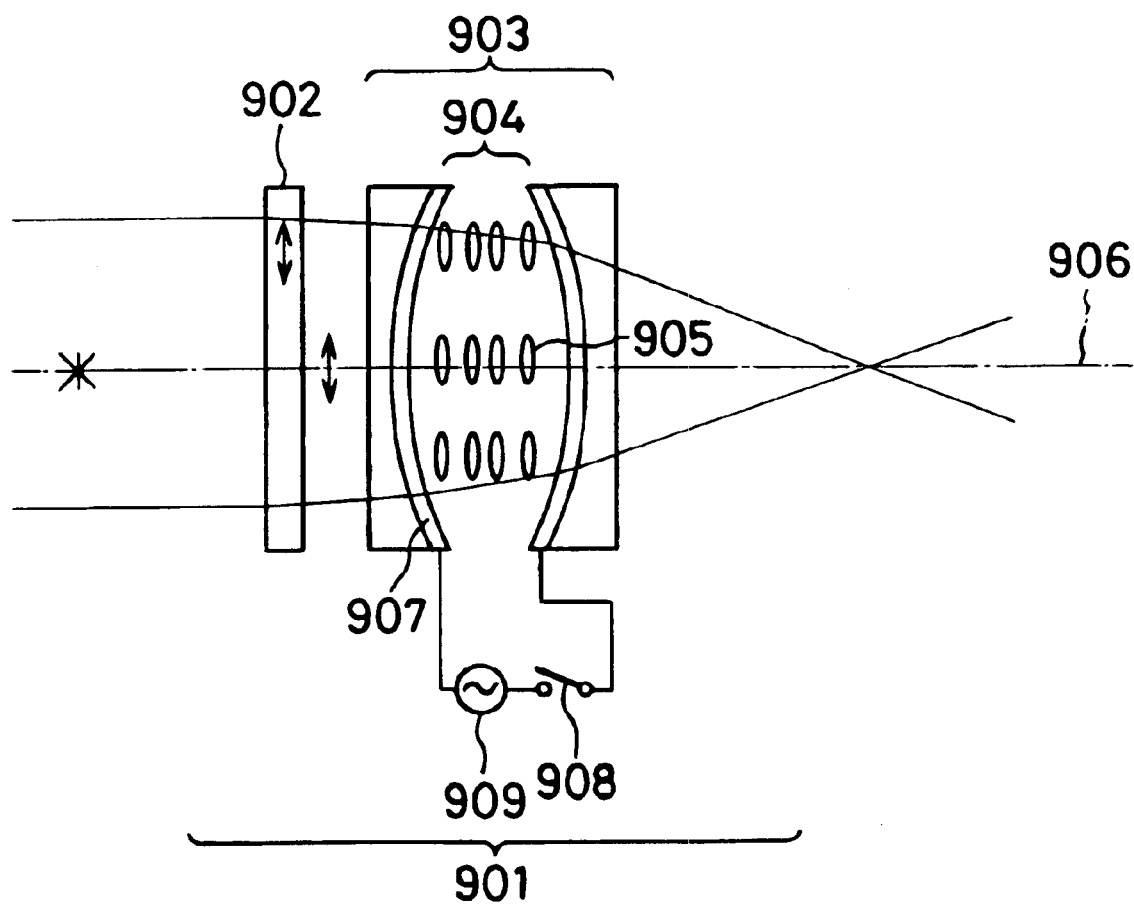
FIG. 23 is illustrative of one construction of a conventional liquid crystal lens.

FIG. 22 is illustrative of an infrared digital hologram endoscope 206, wherein instead of the semiconductor lasers 201 of FIG. 21, an infrared semiconductor laser 207 is used.

This embodiment, because of using infrared light, has an additional merit of enabling even the interior of a living body to be examined. Preferably in this case, it is preferable to meet the following condition (13):

$$\lambda > 800\ nm \qquad (13)$$

where λ is the wavelength of the infrared light used. This is because in-vivo light absorption can be reduced.

To obtain an image of ordinary visible light, it is preferable to provide the infrared digital hologram endoscope 206 with a visible image pickup system and a visible illumination system 208. The visible illumination system 208 is made up of an illumination lens 209 and a light guide 210. The micro-pixel solid-state image sensor 202 can capture even visible light, and so can be used for a visible image pickup system. Instead, it is also acceptable to provide the infrared digital hologram endoscope 206 with a fiber scope observation system for visible light or an electronic scope observation system for visible light.

By way of example but not by way of limitation, other embodiments of the variable hologram element and the optical device using the same are given below.

(1) A variable hologram element characterized by using a polymer dispersed liquid crystal or a polymer stabilized liquid crystal.

(2) The variable hologram element according to (1) above, characterized in that a substrate therefor has a lens or mirror action.

(3) The variable hologram element according to (1) above, characterized by satisfying at least one of conditions (1), (4), (8), (10) and (11).

(4) A variable hologram device characterized in that a plurality of variable hologram elements, each according to (1) above, are laminated together with a transparent electrode interposed therebetween.

(5) A finder for an image pickup device characterized by using a variable hologram element.

(6) The finder for an image pickup device according to (5) above, characterized by including a light source having a short half bandwidth.

(7) The finder for an image pickup device according to (5) above, characterized by satisfying at least one of conditions (5) and (6).

(8) A finder for a digital camera, characterized by using a variable hologram element.

(9) A single-lens reflex, Galilean or Albada type finder, characterized by using a variable hologram element.

(10) A wearable information device, characterized by using a variable hologram element.

(11) The wearable information device according to (10) above, characterized in that said wearable information device is used with a light source having a short half bandwidth.

(12) The wearable information device according to (10) above, characterized in that said variable hologram element is used for an adapter or case.

(13) The wearable information device according to (10) above, characterized in that said wearable information device may be used in the form of a head mount display.

(14) The wearable information device according to (13) above, characterized by having functions of glasses and a display.

(15) A display for an image pickup device, characterized by using a variable hologram element.

(16) The display for an image pickup device according to (15) above, characterized by including a light source having a short half bandwidth.

(17) The display for an image pickup device according to (15) above, characterized in that said variable hologram element is used for an adapter or case.

(18) Variable-focus glasses, characterized by using a variable hologram element.

(19) The variable-focus glasses according to (18) above, characterized by including a light source having a short half bandwidth.

(20) The variable-focus glasses according to (18) above, characterized in that said glasses are used with a light source having a short half bandwidth.

(21) An optical pickup, characterized by using a variable hologram element.

(22) An optical pickup for disks with varying thicknesses, characterized by using a variable hologram element.

(23) The optical pickup according to (21) or (22) above, characterized in that said optical pickup is used with a light source having a short half bandwidth.

(24) An optical measuring device, characterized in that a variable hologram element is used for optical path switching.

(25) An optical measuring device, characterized by using a variable hologram element.

(26) The optical measuring device according to (24) or (25) above, characterized in that said optical measuring device is used with a light source having a short half bandwidth.

(27) A decentration measuring device, characterized in that a variable hologram element is used for optical path switching.

(28) A decentration measuring device, characterized by using a variable hologram element.

(29) A variable hologram element, characterized by comprising a liquid crystal impregnated in interstitial voids in a photonic crystal.

(30) A variable hologram element, characterized by comprising a photonic crystal and a liquid crystal.

(31) An endoscope, characterized in that an image is formed by a digital hologram.

(32) The endoscope according to (31) above, characterized by satisfying condition (12) or (12-1).

(33) The endoscope according to (31) above, characterized in that an image is formed by a digital hologram using infrared light.

(34) The endoscope according to (33) above, characterized in that visible light is observable.

(35) The endoscope according to (31) above, characterized by including a trichromatic light source.

(36) The endoscope according to (33) above, characterized by satisfying condition (13).

(37) The endoscope according to any one of (31) to (36) above, characterized by including a half-silvered mirror prism.

(38) A head mount display, characterized by using a variable hologram element and having functions of glasses and a display.

(39) An optical measuring device, characterized by using a variable hologram element having an optical path switching function.

(40) A device, characterized in that the hologram element according to any one of (5), (8), (9), (10), (15), (18), (21), (22), (24), (25), (27) and (28) above is constructed, using a polymer dispersed liquid crystal or a polymer stabilized liquid crystal.

According to the present invention, it is possible to achieve a liquid crystal variable hologram element with variable optical properties and an optical device using the same.

What I claim is:

1. A variable optical element, comprising:

a liquid crystal, and a photonic crystal having a two-dimensional or three-dimensional lattice structure, wherein layers of said liquid crystal form a non-periodic pattern, wherein said layers of said liquid crystal and layers of said photonic crystal are configured and arranged to converge or diverge light.

2. The variable optical element of claim 1, wherein any one of the following conditions are satisfied:

$$|n_p - n_o| < 0.15$$

$$0 \leq |\theta| < 30°$$

$0 \leq |\alpha_{max}| < 40°$ $n_L = wn_p + (1-w)(2n_o + n_e)/3$ $n_p = n_L$ $|n_p - n_L| < 0.15$ where, n$_p$ is a refractive index of the polymer, n$_o$ is the refractive index along an axis perpendicular to the longitudinal axis of the liquid crystal molecule, θ is the optical axis of the finder with respect to normal, α$_{max}$ is the maximum value of angle of a light ray passing through the variable hologram with respect to normal, n$_L$ is the refractive index of the liquid crystal layer, w is the volumetric proportion of the polymer in the liquid crystal layer, n$_e$ is the refractive index along the longitudinal axis of the liquid crystal molecule.

3. A display having a variable optical element as set forth in claim 1.

4. Variable-focus glasses having a variable optical element as set forth in claim 1.

5. A finder having a variable optical element as set forth in claim 1.

6. An optical pickup having a variable optical element as set forth in claim 1.

7. A measuring device having a variable optical element as set forth in claim 1.

8. An optical device having a variable optical element as set forth in claim 1.

9. A variable optical element comprising:
a liquid crystal impregnated into interstitial voids in a photonic crystal having a two-dimensional or three-dimensional lattice structure,
wherein layers of said liquid crystal form a non-periodic pattern,
wherein said layers of said liquid crystal and layers of said photonic crystal are configured and arranged to converge or diverge light
wherein said liquid crystal layer and said photonic crystal are configured and arranged to converge or diverge light.

10. A variable optical element comprising:
a variable refractive-index substance and a photonic crystal having a two-dimensional or three-dimensional lattice structure,
wherein layers of said liquid crystal form a non-periodic pattern,
wherein layers of said variable refractive index substance and layers of said photonic crystal are configured and arranged to converge or diverge light.

11. A variable optical element comprising:
a variable refractive-index substance impregnated into interstitial voids in a photonic crystal having a two-dimensional or three-dimensional lattice structure,
wherein layers of said liquid crystal form a non-periodic pattern.
wherein layers of said variable refractive-index substance and layers of said photonic crystal are configured and arranged to converge or diverge light.

* * * * *